United States Patent
Suzuki

[19]

[11] Patent Number: 6,167,418

[45] Date of Patent: Dec. 26, 2000

[54] BYTE-SWITCHING ARITHMETIC UNIT

[75] Inventor: Kazumasa Suzuki, Tokyo, Japan

[73] Assignee: NEC Corporation, Tokyo, Japan

[21] Appl. No.: 09/179,627

[22] Filed: Oct. 27, 1998

[30] Foreign Application Priority Data

Oct. 28, 1997 [JP] Japan ................................. 9-295398

[51] Int. Cl.[7] ................................ G06F 7/38; G06F 7/52
[52] U.S. Cl. ......................... 708/490; 708/653; 370/208; 370/211
[58] Field of Search .................................. 370/208, 211, 370/472; 382/260, 282, 283, 303; 708/168, 170, 203, 300, 316, 490, 653, 290, 400; 348/390; 331/1 A

[56] References Cited

U.S. PATENT DOCUMENTS

| | | | |
|---|---|---|---|
| 5,163,103 | 11/1992 | Uetani et al. ............................ | 382/250 |
| 5,216,516 | 6/1993 | Tanaka et al. ........................... | 358/426 |
| 5,517,437 | 5/1996 | Yamashita et al. ...................... | 708/490 |
| 5,638,367 | 6/1997 | Gaytan et al. . | |
| 5,737,256 | 4/1998 | Nakagawa et al. ...................... | 708/400 |
| 5,787,031 | 7/1998 | Ichikawa et al. ........................ | 708/653 |
| 5,789,985 | 8/1998 | Yamauchi et al. ....................... | 331/1 A |
| 5,951,625 | 9/1999 | Duvanenko et al. .................... | 708/290 |

FOREIGN PATENT DOCUMENTS 693 08 699  6/1997  Germany .

*Primary Examiner*—Meng-Ai T. An
*Assistant Examiner*—Te (Susan) Chen
*Attorney, Agent, or Firm*—Young & Thompson

[57] ABSTRACT

The present invention provides a byte-switching arithmetic unit comprising at least three stages, each of which has a plurality of two-input selectors operable in a predetermined minimum bit width unit, the byte-switching arithmetic unit having two inputs of a predetermined input bit width, wherein a first stage has a first number of first stage two-input selectors where the first number corresponds to a quotient of a division to the predetermined input bit width by the predetermined minimum bit width unit, wherein a second stage has a second number of second stage two-input selectors where the second number corresponds to a half of the first number so that the second stage two-input selectors receive a half of outputs from the first stage two-input selectors, and wherein a third stage has a third number of third stage two-input selectors where the third number also corresponds to the half of the first number so that the third stage two-input selectors receive both a half of outputs from the second stage two-input selectors and a half of outputs from a remaining half group of the first stage two-input selectors.

9 Claims, 10 Drawing Sheets

FIG. 1   prior art

| | | | | | | | | |
|---|---|---|---|---|---|---|---|---|
| Input A | A1 | A2 | A3 | A4 | A5 | A6 | A7 | A8 |
| Input B | B1 | B2 | B3 | B4 | B5 | B6 | B7 | B8 |
| Command 1H | A1 | A2 | A3 | A4 | B1 | B2 | B3 | B4 |
| Command 1L | A5 | A6 | A7 | A8 | B5 | B6 | B7 | B8 |
| Command 2H | A1 | A2 | B1 | B2 | A3 | A4 | B3 | B4 |
| Command 2L | A5 | A6 | B5 | B6 | A7 | A8 | B7 | B8 |
| Command 3H | A1 | B1 | A2 | B2 | A3 | B3 | A4 | B4 |
| Command 3L | A5 | B5 | A6 | B6 | A7 | B7 | A8 | B8 |

FIG. 7

| | | | | | | | | |
|---|---|---|---|---|---|---|---|---|
| Input A | A1 | A2 | A3 | A4 | A5 | A6 | A7 | A8 |
| Input B | B1 | B2 | B3 | B4 | B5 | B6 | B7 | B8 |
| Command 1H | A1 | A2 | A3 | A4 | B1 | B2 | B3 | B4 |
| Command 1L | A5 | A6 | A7 | A8 | B5 | B6 | B7 | B8 |
| Command 2H | A1 | A2 | B1 | B2 | A3 | A4 | B3 | B4 |
| Command 2L | A5 | A6 | B5 | B6 | A7 | A8 | B7 | B8 |
| Command 3H | A1 | B1 | A2 | B2 | A3 | B3 | A4 | B4 |
| Command 3L | A5 | B5 | A6 | B6 | A7 | B7 | A8 | B8 |

BYTE-SWITCHING ARITHMETIC UNIT

BACKGROUND OF THE INVENTION

The present invention relates to a byte-switching arithmetic unit, and more particularly to an arithmetic unit for switching operations of data to be subjected to a pre-processing for subsequent parallel processing to image data.

For image processings, data for individual pixels may often comprise integers of 8-bits or 16-bits or fixed decimals. The individual pixel data are used to repeat the same operations for image processings, for which reason the data are subjected to the parallel processings or parallel operations in order to increase an amount of data processings in a unit time. In order to prepare data to be parallel-processed, a pre-processing to the data is carried out by use of the byte-switching arithmetic unit. This byte-switching arithmetic unit is further used to switch or return the parallel-processed results into sequential data.

FIG. 1 is a diagram illustrative of the byte-switching operations, wherein the processing is carried out in 64-bits width by use of three different arithmetic units capable of parallel processings of data in three different bit widths, for example, 8-bits width, 16-bits width and 32-bits width. Inputs comprise two 64-bits numbers "A" and "B", each of which is divided into 8-bits numbers to generate "A1", "A2", "A3", "A4", "A5", "A6", "A7" and "A8" as well as "B1", "B2", "B3", "B4", "B5", "B6", "B7" and "B8" in the high orders.

In the above cases, there are different six operations. The operations in the 32-bits width are to create a first 64-bit order "1H" of "A1", "A2", "A3", "A4", "B1", "B2", "B3" and "B4" as well as to create a second 64-bit order "1L" of "A5", "A6", "A7", "A8", "B5", "B6", "B7" and "B8". The operations in the 16-bits width are to create a third 64-bit order "2H" of "A1", "A2", "B1", "B2", "A3", "A4", "B3" and "B4" as well as to create a fourth 64-bit order "2L" of "A5", "A6", "B5", "B6", "A7", "A8", "B7" and "B8". The operations in the 8-bits width are to create a fifth 64-bit order "3H" of "A1", "B1", "A2", "B2", "A3", "B3", "A4" and "B4" as well as to create a sixth 64-bit order "3L" of "A5", "B5", "A6", "B6", "A7", "B7", "A8" and "B8".

In order to realize the above operations, a set of eight selectors 2 is used for 8-bits, wherein each of the eight selectors 2 has six inputs into which corresponding signals to individual operations are inputted, whereby selecting operations are determined by the kinds of the operations. FIG. 2 is a diagram illustrative of a first conventional circuit comprising a set of eight selectors for 8-bits, wherein each of the eight selectors has six inputs.

FIG. 3A is a circuit diagram illustrative of first type of the selectors having six inputs illustrated in FIG. 2. FIG. 3B is a circuit diagram illustrative of second type of the selectors having six inputs illustrated in FIG. 2.

With reference to FIG. 3A, the six-input selector has five inputs connected to five control signal lines on which control signals are transmitted, wherein if a control signal transmitted on one control signal line is high level "1", then means that this control signal line is selected. The remaining one input of the six-input selector is also connected to a line which is to be selected only when all of the five control signal lines are not selected. The six-input selector comprises a set of six pairs of a transfer gate 10 and an inverter 30. The transfer gate 10 comprises a CMOS circuit which further comprises a pair of n-channel and p-channel MOS field effect transistors 12 and 13. As the scale down of the semiconductor devices to be integrated in a semiconductor integration circuit is advanced, then a reduction in the number of the lines and interconnections might be more effective for reducing the area of the integrated circuit than a reduction in the number of the transistors, for which reason the above selector circuit is designed in order to reduce the number of the lines or interconnections as many as possible. The number of the required transistors is 34 for 1-bit, whilst the 64-bits requires 2176 transistors. The number of the control signal lines extending in the horizontal direction is 5, whilst data signal lines extending in the horizontal direction is 96. Accordingly, a total number of the control signal lines and the data signal lines extending in the horizontal direction is 101.

With reference to FIG. 3B, the six-input selector has six inputs connected to six control signal lines, each of which is selected by the high level signal "1". The selector comprises a set of six pairs of a transfer gate 10 and an invertor 30. The transfer gate 10 comprises a CMOS circuit which further comprises a pair of n-channel and p-channel MOS field effect transistors 12 and 13. The number of the required transistors is 24 for 1-bit, whilst the 64-bits requires 1536 transistors. The number of the control signal lines extending in the horizontal direction is 6, whilst data signal lines extending in the horizontal direction is 96. Accordingly, a total number of the control signal lines and the data signal lines extending in the horizontal direction is 102.

FIG. 4 is a diagram illustrative of a second conventional circuit comprising a set of eight selectors for 8-bits, wherein each of the eight selectors has at most six inputs. The selectors are designed to provide the minimum number of the essential or required inputs for every 8-bits so as to reduce the number of the transistors. Two of a two-input selector 3 are provided for most and least significant 8-bits respectively. Two of a four-input selector 4 are provided for second most and second least significant 8-bits respectively. Two of a six-input selector 5 are provided for third most and third least significant 8-bits respectively. Two of a four-input selector 6 are provided for a center pair of 8-bits respectively. The reduction in the number of the transistors results in drop of the power to be consumed. The power consumption is different among the two-input selector 3, the four-input selector 4, the six-input selector 5 and the four-input selector 6.

The above first conventional eight selector of FIG. 3A designed to reduce the number of the horizontal lines needs 12 control signal lines and a total number 108 of the control signal lines and the data lines and further 992 transistors. The above second conventional eight selector of FIG. 3B designed to reduce the number of the horizontal lines needs 16 control signal lines and a total number 112 of the control signal lines and the data lines and further 512 transistors.

In the above circumstances, it had been required to develop a novel byte-switching arithmetic unit designed to reduce numbers of transistors and lines for reductions in occupied area and a power to be consumed.

SUMMARY OF THE INVENTION

Accordingly, it is an object of the present invention to provide a novel byte-switching arithmetic unit free from the above problems.

It is a further object of the present invention to provide a novel byte-switching arithmetic unit designed to reduce the number of transistors.

It is a still further object of the present invention to provide a novel byte-switching arithmetic unit designed to reduce the number of lines.

It is yet a further object of the present invention to provide a novel byte-switching arithmetic unit designed to reduce an occupied area thereof.

It is a further more object of the present invention to provide a novel byte-switching arithmetic unit designed to reduce a power to be consumed.

The first present invention provides a byte-switching arithmetic unit comprising at least three stages, each of which has a plurality of two-input selectors operable in a predetermined minimum bit width unit, the byte-switching arithmetic unit having two inputs of a predetermined input bit width, wherein a first stage has a first number of first stage two-input selectors where the first number corresponds to a quotient of a division to the predetermined input bit width by the predetermined minimum bit width unit, wherein a second stage has a second number of second stage two-input selectors where the second number corresponds to a half of the first number so that the second stage two-input selectors receive a half of outputs from the first stage two-input selectors, and wherein a third stage has a third number of third stage two-input selectors where the third number also corresponds to the half of the first number so that the third stage two-input selectors receive both a half of outputs from the second stage two-input selectors and a half of outputs from a remaining half group of the first stage two-input selectors.

The above and other objects, features and advantages of the present invention will be apparent from the following descriptions.

BRIEF DESCRIPTION OF THE DRAWINGS

Preferred embodiments according to the present invention will be described in detail with reference to the accompanying drawings.

FIG. 1 is a diagram illustrative of the byte-switching operations, wherein the processing is carried out in 64-bits width by use of three different arithmetic units capable of parallel processings of data in three different bit widths, for example, 8-bits width, 16-bits width and 32-bits width.

FIG. 7 is a diagram illustrative of the byte-switching operations, wherein the processing is carried out in 64-bits width by use of three different arithmetic units capable of parallel processings of data in three different bit widths, for example, 8-bits width, 16-bits width and 32-bits width.

DISCLOSURE OF THE INVENTION

Figure 2:
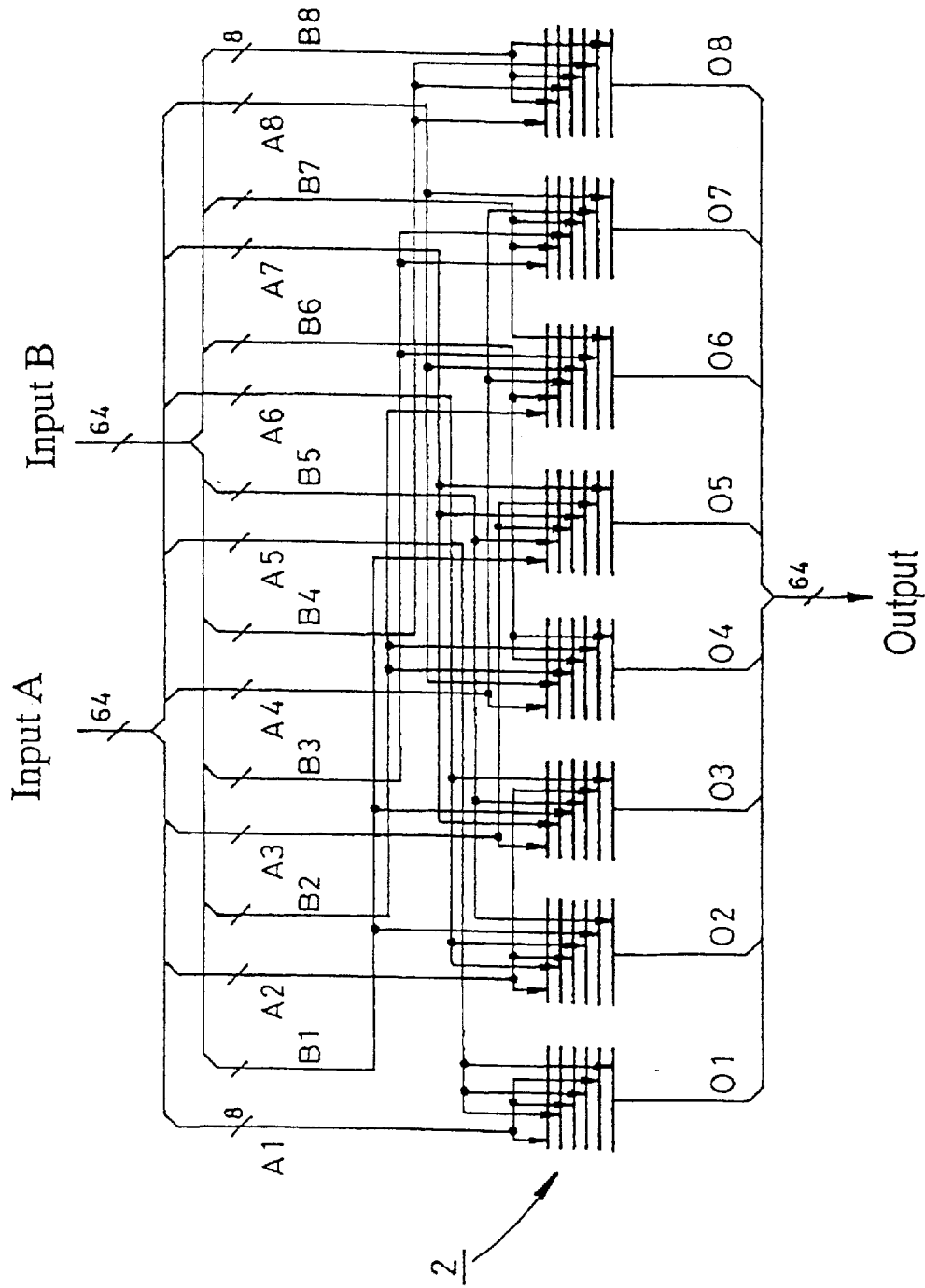
FIG. 2 is a diagram illustrative of a first conventional circuit comprising a set of eight selectors for 8-bits, wherein each of the eight selectors has six inputs.
Figure 3A:
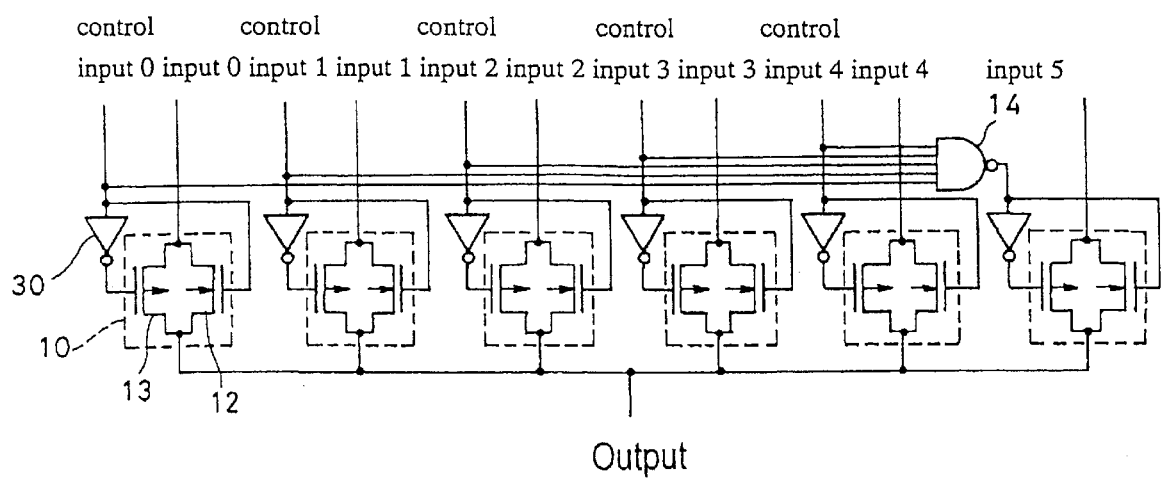
FIG. 3A is a circuit diagram illustrative of first type of the selectors having six inputs illustrated in FIG. 2.
Figure 3B:
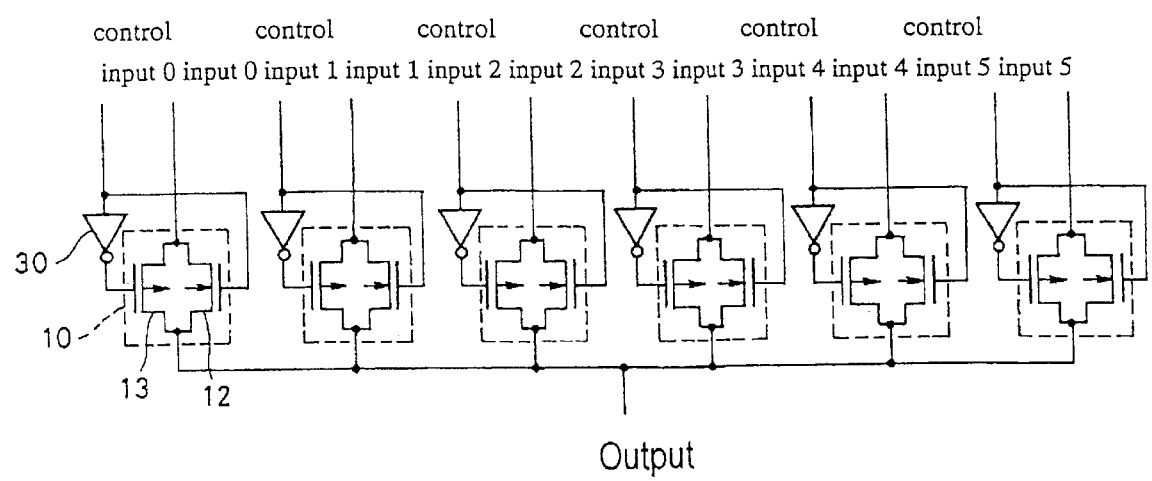
FIG. 3B is a circuit diagram illustrative of second type of the selectors having six inputs illustrated in FIG. 2.
Figure 4:
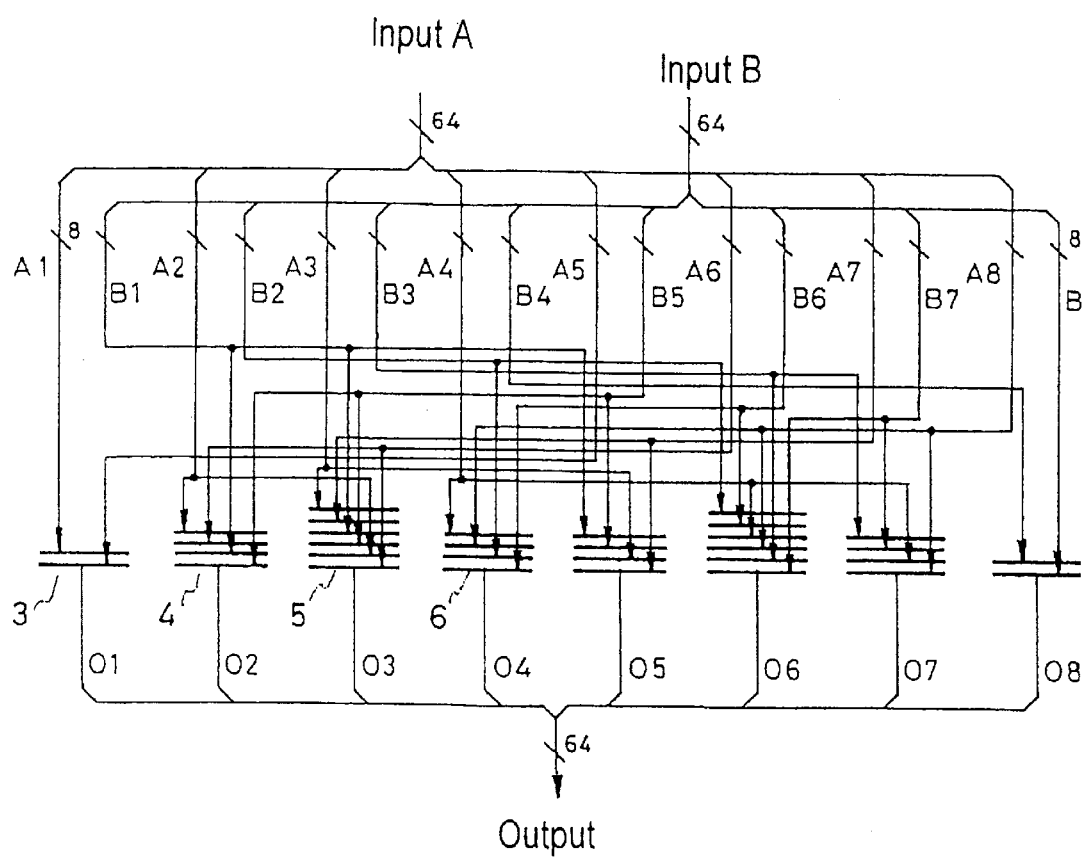
FIG. 4 is a diagram illustrative of a second conventional circuit comprising a set of eight selectors for 8-bits, wherein each of the eight selectors has at most six inputs.

The first present invention provides a byte-switching arithmetic unit comprising at least three stages, each of which has a plurality of two-input selectors operable in a predetermined minimum bit width unit, the byte-switching arithmetic unit having two inputs of a predetermined input bit width, wherein a first stage has a first number of first stage two-input selectors where the first number corresponds to a quotient of a division to the predetermined input bit width by the predetermined minimum bit width unit, wherein a second stage has a second number of second stage two-input selectors where the second number corresponds to a half of the first number so that the second stage two-input selectors receive a half of outputs from the first stage two-input selectors, and wherein a third stage has a third number of third stage two-input selectors where the third number also corresponds to the half of the first number so that the third stage two-input selectors receive both a half of outputs from the second stage two-input selectors and a half of outputs from a remaining half group of the first stage two-input selectors.

It is preferable that the predetermined input bit width is a 64-bit width and the byte-switching arithmetic unit comprises three stages, and the predetermined minimum bit width unit of the selectors is 8-bits, and the first stage has eight of the selectors, the second stage has four of the selectors and the third stage has four of the selectors.

It is also preferable that the predetermined input bit width is a 128-bit width and the byte-switching arithmetic unit comprises three stages, and the predetermined minimum bit width unit of the selectors is 16-bits, and the first stage has eight of the selectors, the second stage has four of the selectors and the third stage has four of the selectors.

It is also preferable that the predetermined input bit width is a 128-bit width and the byte-switching arithmetic unit comprises four stages, and the predetermined minimum bit width unit of the selectors is 8-bits, and the first stage has sixteen of the selectors, the second stage has eight of the selectors and the third stage has eight of the selectors and also a fourth stage also has eight of the selectors.

The second present invention also provides a circuitry for byte-switching operations, the circuitry comprising at least three stages, each of which has a plurality of selectors having a plurality of inputs operable in a predetermined minimum bit width unit, the circuitry having the same number of inputs as the inputs of each of the selectors, and the inputs of the circuitry having a predetermined input bit width, wherein a first stage has a first number of first stage two-input selectors where the first number corresponds to a quotient of a division to the predetermined input bit width by the predetermined minimum bit width unit, wherein a second stage has a second number of second stage two-input selectors where the second number corresponds to a half of the first number so that the second stage two-input selectors receive a half of outputs from the first stage two-input selectors, and wherein a third stage has a third number of third stage two-input selectors where the third number also corresponds to the half of the first number so that the third stage two-input selectors receive both a half of outputs from the second stage two-input selectors and a half of outputs from a remaining half group of the first stage two-input selectors.

It is preferable that each of the selectors has two inputs and the circuitry also has two inputs.

It is preferable that the predetermined input bit width is a 64-bit width and the circuitry comprises three stages, and the predetermined minimum bit width unit of the selectors is 8-bits, and the first stage has eight of the selectors, the second stage has four of the selectors and the third stage has four of the selectors.

It is preferable that the predetermined input bit width is a 128-bit width and the circuitry comprises three stages, and the predetermined minimum bit width unit of the selectors is 16-bits, and the first stage has eight of the selectors, the second stage has four of the selectors and the third stage has four of the selectors.

It is preferable that the predetermined input bit width is a 128-bit width and the circuitry comprises four stages, and the predetermined minimum bit width unit of the selectors is 8-bits, and the first stage has sixteen of the selectors, the second stage has eight of the selectors and the third stage has eight of the selectors and also a fourth stage also has eight of the selectors.

PREFERRED EMBODIMENTS

First Embodiment

A first embodiment according to the present invention will be described in detail with reference to FIG. 5 which is a diagram illustrative of a circuit of a first novel byte-switching arithmetic unit comprising a set of three stages having selectors. The first novel byte-switching arithmetic unit comprises first, second and third stages. The first novel byte-switching arithmetic unit has two 64-bit inputs "A" and "B". The first stage has eight two-input selectors S11 to S18. The second stage has four two-input selectors S21 to S24. The third stage has four two-input selectors S31 to S34. The two 64-bit inputs "A" and "B" are divided into eight 8-bits "A1" to "A8" and eight 8-bits "B1" to "B8" respectively. The selector S11 on the first stage receives two inputs "A1" and "A5". The selector S12 on the first stage receives two inputs "B1" and "B5". The selector S13 on the first stage receives two inputs "A2" and "A6". The selector S14 on the first stage receives two inputs "B2" and "B6". The selector S15 on the first stage receives two inputs "A3" and "A7". The selector S16 on the first stage receives two inputs "B3" and "B7". The selector S17 on the first stage receives two inputs "A4" and "A8". The selector S18 on the first stage receives two inputs "B4" and "B8". The selectors S11 to S18 are operated under a control by a control signal to select any one of the two inputs. If the selectors select former one of the above inputs, then the command 3H of FIG. 7 is executed. If the selectors select latter one of the above inputs, then the command 3L of FIG. 7 is executed.

The selectors S21 to S24 on the second stage are operated to select whether or not the second and third significant bytes are switched and also select whether or not the sixth and seventh significant bytes are switched. If the switching operation is executed, then the commands "2H" and "2L" are executed. If no switching operation is executed, then the commands "3H" and "3L" are executed.

The selectors S31 to S34 on the third stage are operated to select whether or not center 16 bits are switched. If the switching operation is executed, then the commands "1H" and "1L" are executed. If no switching operation is executed, then the commands "2H" and "2L" are executed. If no switching operation is executed on the second stage, then no switching operation is also executed. The above operations on the three stages execute all of the commands or instructions as illustrated in FIG. 7.

Figure 5:
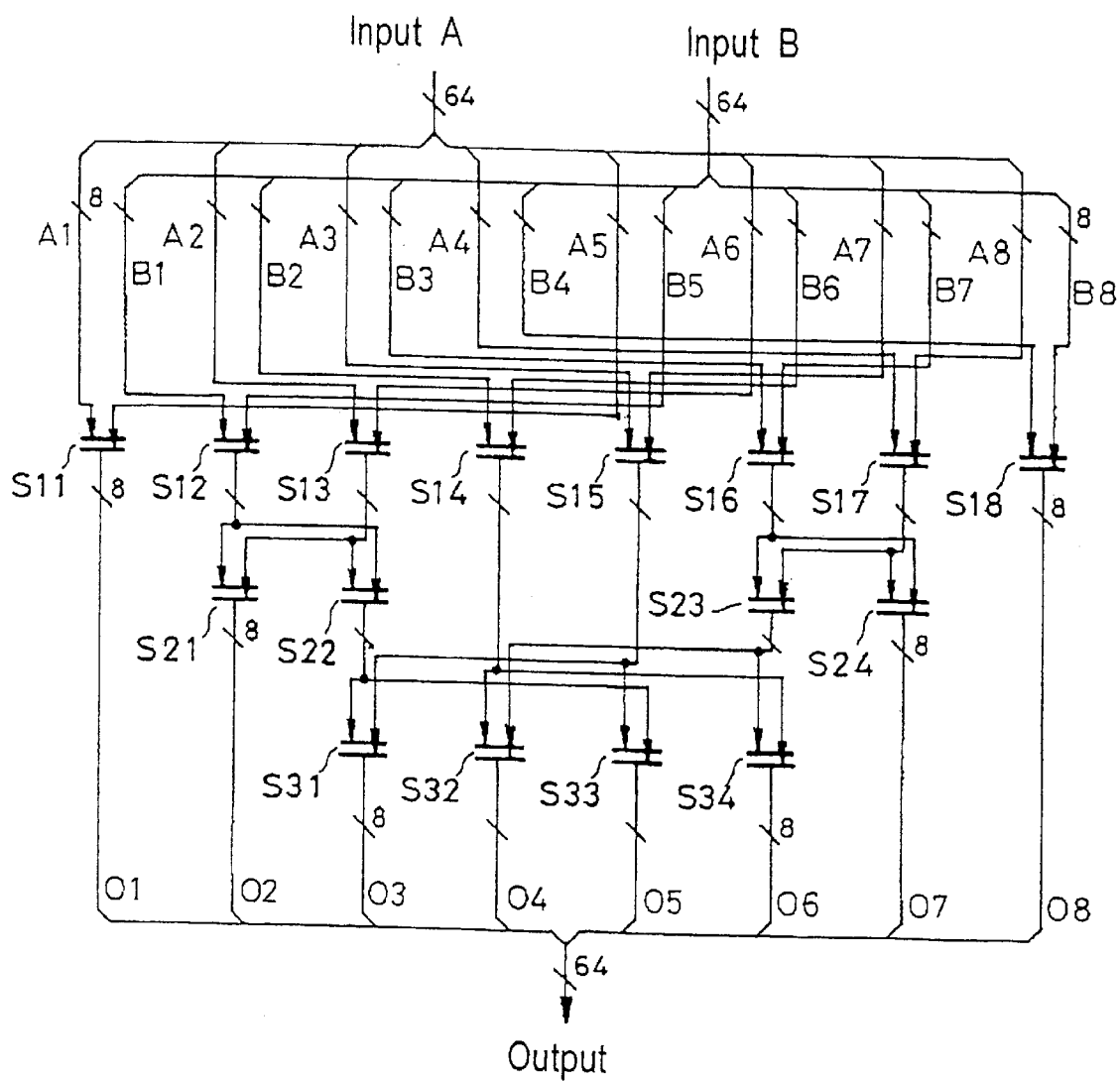
FIG. 5 is a diagram illustrative of a circuit of a first novel byte-switching arithmetic unit comprising a set of three stages having selectors in a first embodiment in accordance with the present invention.
Figure 6:
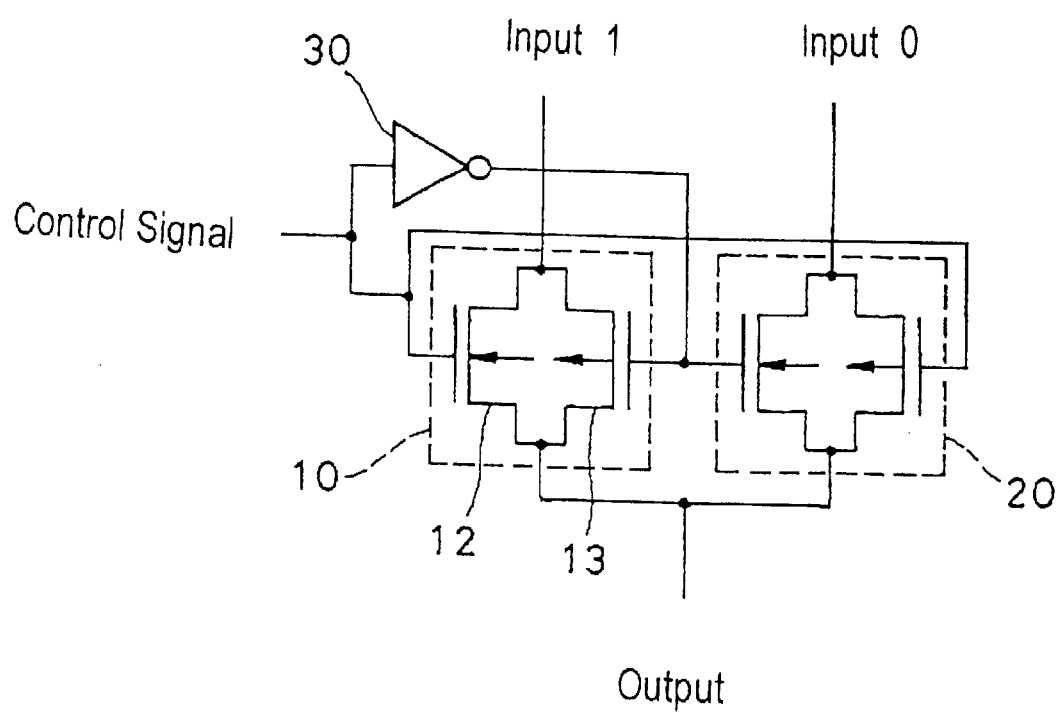
FIG. 6 is a circuit diagram illustrative of the two-input selector in the above novel byte-switching arithmetic unit of FIG. 5.

FIG. 6 is a circuit diagram illustrative of the above two-input selector in the above novel byte-switching arithmetic unit of FIG. 5. The two-input selector comprises a pair of transfer gates 10 and 20, each of which comprises n-channel and p-channel MOS field effect transistors 12 and 13. The first transfer gate 10 receives an input "1" and the second transfer gate 12 receives an input "0". The first and second transfer gates 10 and 20 receives a single or common control signal so that any one of the first and second transfer gates 10 and 20 turns ON to transfer any one of the inputs "1" and "0" into an output. If the control signal is low level "0", then the second transfer gate 20 turns ON to transfer the input "0" into the output. If the control signal is low level "1", then the first transfer gate 10 turns ON to transfer the input "1" into the output.

Figure 8:
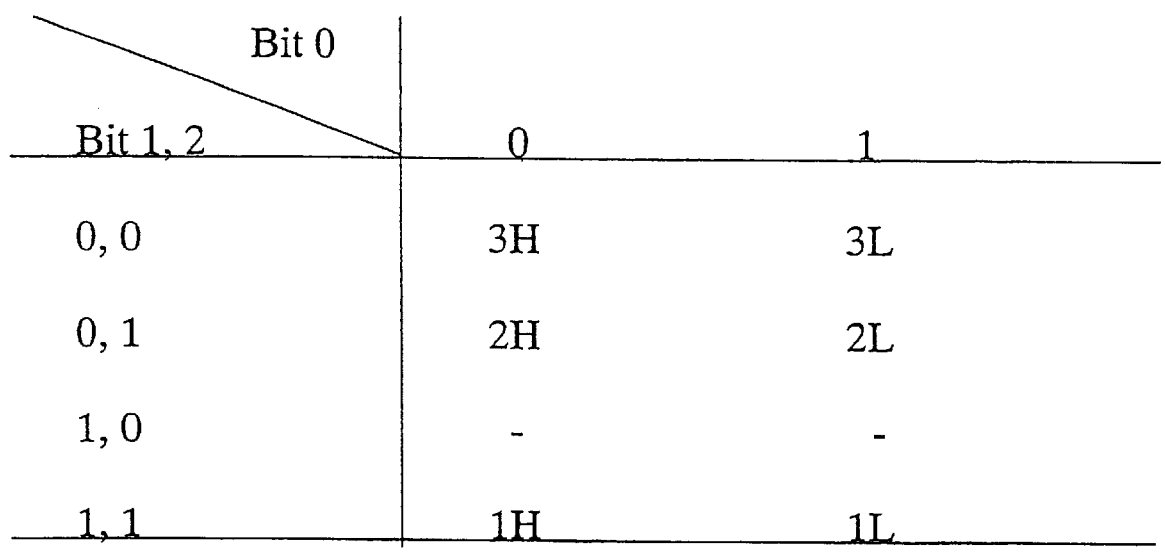
FIG. 8 is a view illustrative of allocations of three bits in the eight bits of commends in FIG. 7.

Three bits in the eight bits of FIG. 7 are allocated as illustrated in FIG. 8. One of the three bits is allocated to indicate "H" or "L". The remaining two of the three bits are allocated to indicate "0" if the commands "3H" and "3L" are executed, or to indicate "01" if the commands "2H" and "2L" are executed, or to indicate "11" if the commands "1H" and "1L" are executed. If the allocations of the three bits in the eight bits of FIG. 7 are conducted as described above, then it is unnecessary to decode the commands or instructions for preparations of the control signals for the above operations.

As a first modification, the 64-bit width of the input and output may be extended to 128-bit width. In this case, the following two options are available. The first option is that the minimum bit-width unit is 8 bits. The second option is that the minimum bit-width unit is 16 bits.

if the second option is selected, then 16-bit selectors responsible for 16-bits are used. The available circuit configuration is the same as illustrated in FIG. 5.

Figure 9:
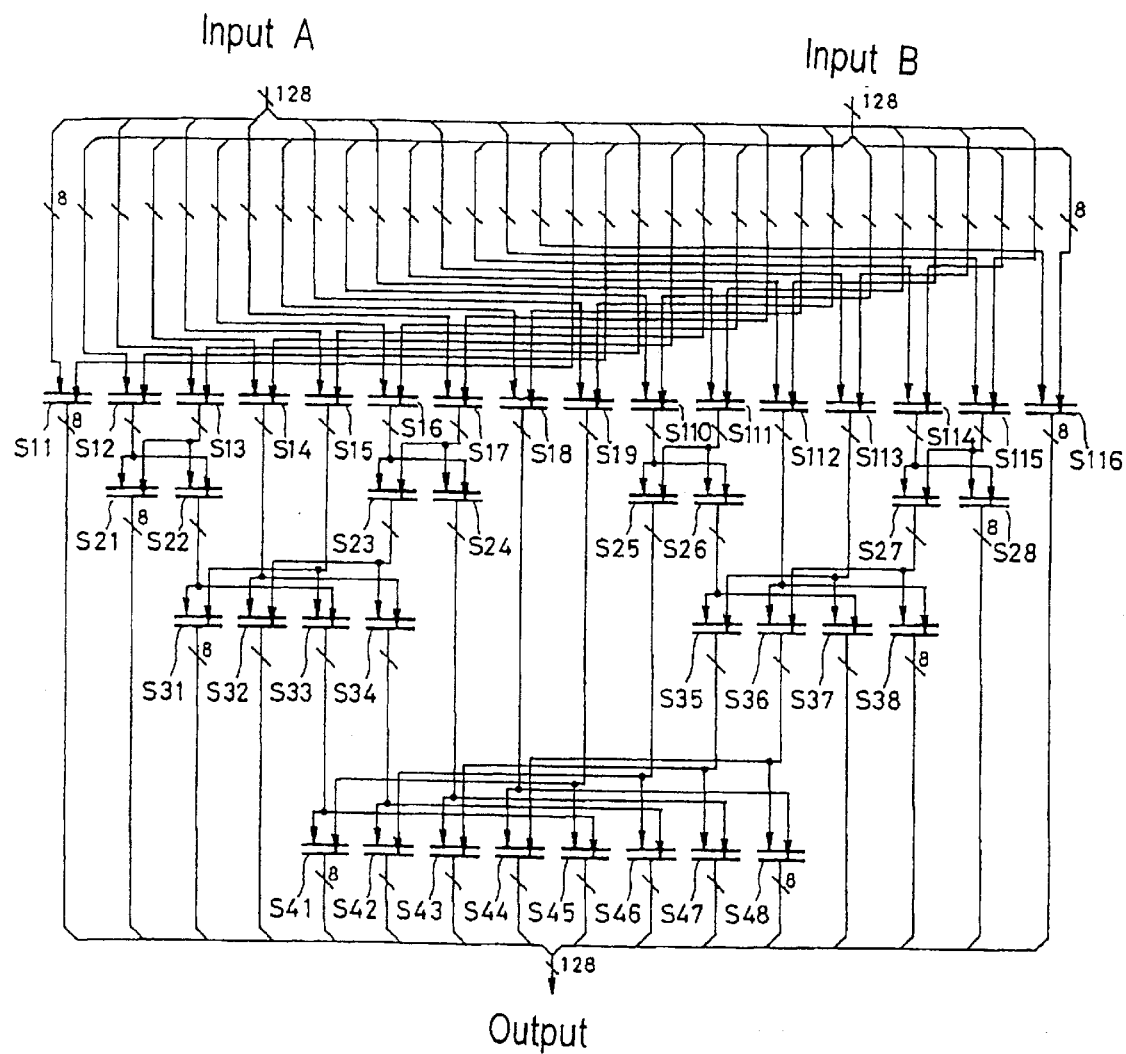
FIG. 9 is a diagram illustrative of a circuit of a second novel byte-switching arithmetic unit comprising a set of four stages having selectors in a modified embodiment in accordance with the present invention.

If, however, the first option is selected, then it is necessary to change the above circuit configuration. In this case, the circuit comprises four stages as illustrated in FIG. 9. The first stage has sixteen two-input selectors S11 to S116 responsible for 8-bits. The selectors 11 to S116 are operated to select higher order 64-bits or lower order 64-bits for every 128-bit inputs "A" and "B". If the switching is stopped on the first stage, then the switching in 8-bit width unit can be realized.

The second stage has eight selectors S21 to S28. The eight selectors S21 to S28 are operated to select whether or not center 8-bits are switched in each of four 32-bit groups divided from the 128-bit input in order to realize switching operations in eight-bit unit.

The third stage has eight selectors S31 to S38. The eight selectors S31 to S38 are operated to select whether or not inner 16-bits are switched to each other in each of two 64-bit groups divided from the 128-bit input in order to realize switching operations in not more than 16-bits or 32-bits.

The fourth stage has eight selectors S41 to S48. The eight selectors S41 to S48 are operated to select whether or not center 32-bits are switched to each other in order to realize switching operations in not more than 32-bits or 64-bits.

In order to reduce an occupied area of the byte-switching arithmetic unit for increase in density of the integration, it is necessary to reduce the numbers of the transistors and lines. The novel circuit configuration of the above present invention reduces the numbers of the required transistor and lines. In case of 64-bits where the two-bit selector requires six transistors, the novel circuit requires 768 transistors and 99 lines as a total number of 3 control signal lines and 96 data lines. The numbers of the transistors and lines of the novel circuit are reduced as compared to the conventional circuit.

The above novel circuit uses two-input selectors to enable switching operations of the input signals by a single control signal line, thereby simplifying the circuit configuration. In case of 64-bits, the above allocations of three bits in the eight bits command makes it unnecessary to decode the command or instruction codes, whereby the use of the three bits enables the switching operations of the instructions.

Whereas modifications of the present invention will be apparent to a person having ordinary skill in the art, to which the invention pertains, it is to be understood that embodiments as shown and described by way of illustrations are by no means intended to be considered in a limiting sense. Accordingly, it is to be intended to cover by claims all modifications which fall within the spirit and scope of the present invention.

What is claimed is:

1. A byte-switching arithmetic unit comprising at least three stages, each of which has a plurality of two-input selectors operable in a predetermined minimum bit width unit, said byte-switching arithmetic unit having two inputs of a predetermined input bit width, wherein a first stage has a first number of first stage two-input selectors where said first number corresponds to a quotient of a division to said predetermined input bit width of the two inputs by said predetermined minimum bit width unit, wherein a second stage has a second number of second stage two-input selectors where said second number corresponds to a half of said first number so that said second stage two-input selectors receive a half of outputs from said first stage two-input selectors, and wherein a third stage has a third number of third stage two-input selectors where said third number also corresponds to said half of said first number so that said third stage two-input selectors receive both a half of outputs from said second stage two-input selectors and a half of outputs from a remaining half group of said first stage two-input selectors.

2. The byte-switching arithmetic unit as claimed in claim 1, wherein said predetermined input bit width is a 64-bit width and said byte-switching arithmetic unit comprises three stages, and said predetermined minimum bit width unit of said selectors is 8-bits, and said first stage has eight of said selectors, said second stage has four of said selectors and said third stage has four of said selectors.

3. The byte-switching arithmetic unit as claimed in claim 1, wherein said predetermined input bit width is a 128-bit width and said byte-switching arithmetic unit comprises three stages, and said predetermined minimum bit width unit of said selectors is 16-bits, and said first stage has eight of said selectors, said second stage has four of said selectors and said third stage has four of said selectors.

4. The byte-switching arithmetic unit as claimed in claim 1, wherein said predetermined input bit width is a 128-bit width and said byte-switching arithmetic unit comprises four stages, and said predetermined minimum bit width unit of said selectors is 8-bits, and said first stage has sixteen of said selectors, said second stage has eight of said selectors and said third stage has eight of said selectors and also a fourth stage also has eight of said selectors.

5. A circuitry for byte-switching operations, said circuitry comprising at least three stages, each of which has a plurality of selectors having a plurality of inputs operable in a predetermined minimum bit width unit, said circuitry having the same number of inputs as said inputs of each of said selectors, and said inputs of said circuitry having a predetermined input bit width, wherein a first stage has a first number of first stage two-input selectors where said first number corresponds to a quotient of a division to said predetermined input bit width of the two inputs by said predetermined minimum bit width unit, wherein a second stage has a second number of second stage two-input selectors where said second number corresponds to a half of said first number so that said second stage two-input selectors receive a half of outputs from said first stage two-input selectors, and wherein a third stage has a third number of third stage two-input selectors where said third number also corresponds to said half of said first number so that said third stage two-input selectors receive both a half of outputs from said second stage two-input selectors and a half of outputs from a remaining half group of said first stage two-input selectors.

6. The circuitry as claimed in claim 1, wherein each of said selectors has two inputs and said circuitry also has two inputs.

7. The circuitry as claimed in claim 6, wherein said predetermined input bit width is a 64-bit width and said circuitry comprises three stages, and said predetermined minimum bit width unit of said selectors is 8-bits, and said first stage has eight of said selectors, said second stage has four of said selectors and said third stage has four of said selectors.

8. The circuit as claimed in claim 6, wherein said predetermined input bit width is a 128-bit width and said circuitry comprises three stages, and said predetermined minimum bit width unit of said selectors is 16-bits, and said first stage has eight of said selectors, said second stage has four of said selectors and said third stage has four of said selectors.

9. The circuitry as claimed in claim 6, wherein said predetermined input bit width is a 128-bit width and said circuitry comprises four stages, and said predetermined minimum bit width unit of said selectors is 8-bits, and said first stage has sixteen of said selectors, said second stage has eight of said selectors and said third stage has eight of said selectors and also a fourth stage also has eight of said selectors.

* * * * *